United States Patent
Takahashi et al.

(10) Patent No.: US 11,082,727 B2
(45) Date of Patent: Aug. 3, 2021

(54) RECEPTION APPARATUS, RECEPTION METHOD, TRANSMISSION APPARATUS, AND TRANSMISSION METHOD FOR INDICATING PRESENCE OR ABSENCE OF SIGNALING INFORMATION IN A PAYLOAD OF A PACKET

(71) Applicant: Saturn Licensing LLC, New York, NY (US)

(72) Inventors: Kazuyuki Takahashi, Chiba (JP); Lachlan Bruce Michael, Saitama (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 15/302,101

(22) PCT Filed: Feb. 22, 2016

(86) PCT No.: PCT/JP2016/055040
§ 371 (c)(1),
(2) Date: Oct. 5, 2016

(87) PCT Pub. No.: WO2016/140088
PCT Pub. Date: Sep. 9, 2016

(65) Prior Publication Data
US 2018/0124436 A1    May 3, 2018

(30) Foreign Application Priority Data
Mar. 4, 2015  (JP) .............................. JP2015-042249

(51) Int. Cl.
*H04N 21/236*    (2011.01)
*H04N 21/434*    (2011.01)
(Continued)

(52) U.S. Cl.
CPC ....... *H04N 21/236* (2013.01); *H04L 65/4076* (2013.01); *H04L 69/03* (2013.01);
(Continued)

(58) Field of Classification Search
CPC ............. H04N 21/236; H04N 21/6112; H04N 21/6332; H04N 21/64322;
(Continued)

(56) References Cited

U.S. PATENT DOCUMENTS

2009/0190677 A1    7/2009  Jokela et al.
2011/0158355 A1    6/2011  Shinya et al.
(Continued)

FOREIGN PATENT DOCUMENTS

CN    101933260 A    12/2010
CN    103650390 A    3/2014
(Continued)

OTHER PUBLICATIONS

"Digital Video Broadcasting (DVB); Frame structure channel coding and modulation for a second generation digital terrestrial television broadcasting system (DVB-T2)", ETSI EN 302 755 Vt.2.1, Oct. 2010, 177 pages.
(Continued)

*Primary Examiner* — Jefferey F Harold
*Assistant Examiner* — Alexander Boyd
(74) *Attorney, Agent, or Firm* — Oblon, McClelland, Maier & Neustadt, L.L.P.

(57) ABSTRACT

[Object] The present technology relates to a reception apparatus, a reception method, a transmission apparatus, and a transmission method that enable more flexible operations to be performed.
[Solving Means] A reception apparatus receives a content transmitted in an IP transmission system, acquires, based on first control information that is transmitted in a first layer in
(Continued)

a protocol stack of the IP transmission system and includes information indicating whether second control information transmitted in a second layer higher than the first layer exists, the second control information, and controls operations of units that process the content based on the second control information. The present technology is applicable to television receivers supporting the IP transmission system.

19 Claims, 20 Drawing Sheets

(51) Int. Cl.
    H04L 29/06      (2006.01)
    H04N 21/2381    (2011.01)
    H04N 21/61      (2011.01)
    H04L 29/08      (2006.01)
    H04N 21/643     (2011.01)
(52) U.S. Cl.
    CPC ....... *H04L 69/323* (2013.01); *H04N 21/2381* (2013.01); *H04N 21/23614* (2013.01); *H04N 21/4345* (2013.01); *H04N 21/6112* (2013.01); *H04N 21/6131* (2013.01); *H04N 21/64322* (2013.01)
(58) Field of Classification Search
    CPC ......... H04N 21/23614; H04N 21/2381; H04N 21/4345; H04N 21/6131; H04L 65/4076; H04L 69/03; H04L 69/323
    See application file for complete search history.

(56) References Cited

U.S. PATENT DOCUMENTS

| | | |
|---|---|---|
| 2011/0299628 A1 | 12/2011 | Ko et al. |
| 2014/0120861 A1 | 5/2014 | Kwak et al. |
| 2015/0071153 A1* | 3/2015 | Hong .................... H04L 5/0023 370/311 |
| 2015/0236886 A1* | 8/2015 | Oh ........................ H04L 5/0091 375/295 |
| 2016/0164627 A1* | 6/2016 | Kim ...................... H04L 1/0013 375/267 |
| 2016/0198023 A1* | 7/2016 | Kwon ................ H04N 21/2362 370/474 |
| 2016/0218824 A1* | 7/2016 | Kim ...................... H04L 1/0041 |
| 2016/0219133 A1* | 7/2016 | Kwon ................ H04L 65/4076 |
| 2016/0359744 A1* | 12/2016 | Kwak .................. H04N 21/236 |
| 2016/0373807 A1* | 12/2016 | Kwak ............. H04N 21/64322 |
| 2017/0013093 A1* | 1/2017 | Kwon ................... H04L 69/323 |

FOREIGN PATENT DOCUMENTS

| | | |
|---|---|---|
| CN | 103703764 A | 4/2014 |
| CN | 104247436 A | 12/2014 |
| CN | 106031179 A | 10/2016 |
| EP | 2 239 909 A1 | 10/2010 |
| EP | 2 362 654 A1 | 8/2011 |
| JP | 2013-89985 A | 5/2013 |
| WO | WO 2009/095526 A1 | 8/2009 |
| WO | WO 2011105776 A2 | 9/2011 |

OTHER PUBLICATIONS

International Search Report dated Apr. 26, 2016 in PCT/JP2016/055040 filed Feb. 22, 2016.

* cited by examiner

| Syntax | No of Bits | Mnemonic | Semantics |
|---|---|---|---|
| NUM_PLP | 6 | uimsbf | Number of PLPs |
| reserved | 2 | bslbf | |
| for(i=0;i<NUM_PLP;i++) { | | | |
| LLS_EXIST_FLAG | 1 | bslbf | Flag indicating that LLS is included in PLP |
| PLP_GROUP_ID | 7 | bslbf | PLP group ID |
| } | | | |

FIG.2

| PLP_ID | LLS_EXIST_FLAG | PLP_GROUP_ID |
|---|---|---|
| 0 | 1 | 000 0001 |
| 1 | 1 | 000 0010 |
| 2 | 0 | 000 0011 |
| 3 | 1 | 000 0000 |
| 4 | : | : |
| 63 | : | : |

FIG.3

| PLP_ID | LLS_EXIST_FLAG | PLP_GROUP_ID |
|---|---|---|
| 0 | 0 | 000 0001 |
| 1 | 1 | 000 0001 |
| 2 | 1 | 000 0000 |
| 3 | - | - |
| 4 | - | - |
| 5 | - | - |
| 6 | - | - |
| 7 | - | - |
| ... | - | - |
| 63 | - | - |

NUM_PLP = 3
- PLP group 1: rows 0, 1
- Service configured by independent PLP: row 2
- Not transmitted: rows 3–63

FIG.5

| PLP_ID | LLS_EXIST_FLAG | PLP_GROUP_ID |
|---|---|---|
| 0 | 0 | 000 0001 |
| 1 | 1 | 000 0011 |
| 2 | 0 | 000 0010 |
| 3 | — | — |
| 4 | — | — |
| 5 | — | — |
| 6 | — | — |
| 7 | — | — |
| ... | | |
| 63 | — | — |

NUM_PLP=3 → PLP_GROUP_ID column
PLP group 1 → row 0
PLP group 2 → row 2
Rows 3–63: Not transmitted

FIG.7

| Syntax | No. of Bits |
|---|---|
| NUM_PLP | 8 |
| TYPE_2_PLP_FLAG | 1 |
| CURRENT_FMODE_INTERVAL | 8 |
| OTHER_FMODES_LENGTH | 24 |
| if(FEF_MIXED_FLAG == '1'){ | |
|   FEF_TYPE | 4 |
|   FEF_LENGTH | 22 |
|   FEF_INTERVAL | 8 |
| } | |
| for(i =0;i <NUM_RF_CH_BUNDLED; i ++){ | |
|   RF_INDEX | 3 |
|   BUNDLED_FREQUENCY | 10 |
| } | |
| for(i =0 i <NUM_PLP; i ++){ | |
|   PLP_ID | 8 |
|   PLP_TYPE | 2 |
|   if(INPUT_BBP_MODE == '11'){ | |
|     PLP_BBP_MODE | 2 |
|   } | |
|   if(INPUT_BBP_MODE == '00' & NUM_PLP == '1'){ | |
|     PLP_MA_IND | 1 |
|   } | |

FIG. 9

| Syntax | No of Bits | Mnemonic |
|---|---|---|
| LLS_EXIST_FLAG | 1 | bslbf |
| PLP_GROUP_ID | 7 | bslbf |
| PLP_EMS_PAYLOAD | 1 | |
| PLP_GROUP_ID | 8 | |
| PLP_BUNDLED_FLAG | 1 | |
| PLP_ISSY_IND | 1 | |
| PLP_MOD | 3 | |
| PLP_COD | 4 | |
| PLP_FEC_TYPE | 2 | |
| PLP_NUM_TI_ROWS | 10 | |
| FRAME_INTERVAL | 8 | |
| BBF_FEC_FLAG | 1 | |
| if(BBF_FEC_FLAG == '1'){ | | |
|   BBF_FEC_COD | 3 | |
| } | | |
| RESERVED_1 | 10 | |
| } | | |
| RESERVED_2 | 10 | |

FIG. 9 (Cont'd)

| Syntax | No of Bits | Mnemonic |
|---|---|---|
| LLS_EXIST_FLAG | 1 | bslbf |
| PLP_GROUP_ID | 7 | bslbf |

PLP_GROUP_ID (8 bits)
PLP_COD (3 bits)
PLP_MOD (3 bits)
PLP_ROTATION (1 bit)
PLP_FEC_TYPE (2 bits)
PLP_NUM_BLOCKS_MAX (10 bits)
FRAME_INTERVAL (8 bits)
TIMEF_IL_LENGTH (8 bits)
TIMEF_IL_TYPE (1 bit)
IN_BAND_A_FLAG (1 bit)
IN_BAND_B_FLAG (1 bit)
RESERVED_1 (11 bits)
PLP_MODE (2 bits)
STATIC_FLAG (1 bit)
STATIC_PADDING_FLAG (1 bit)
]
FEF_LENGTH_MSB (2 bits)
RESERVED_2 (30 bits)
for i =0 .. NUM_AUX-1[
AUX_STREAM_TYPE (4 bits)
AUX_PRIVATE_CONF (28 bits)
]

FIG. 11 (Cont'd)

| Slot | Relative TS number |
|---|---|
| 1 | 0 |
| 2 | 0 |
| 3 | 0 |
| 4 | 0 |
| 5 | 1 |
| 6 | 1 |
| 7 | 0 |
| 8 | 1 |
| 9 | 2 |
| ... | |
| 47 | 0 |
| 48 | 7 |

FIG.13

| Relative TS number | TS_ID |
|---|---|
| 0 | 0x0123 |
| 1 | 0x0124 |
| 2 | 0x0125 |
| 3 | 0x0126 |
| 4 | 0x0127 |
| 5 | 0x0128 |
| 6 | 0x0129 |
| 7 | 0x012a |

FIG.14

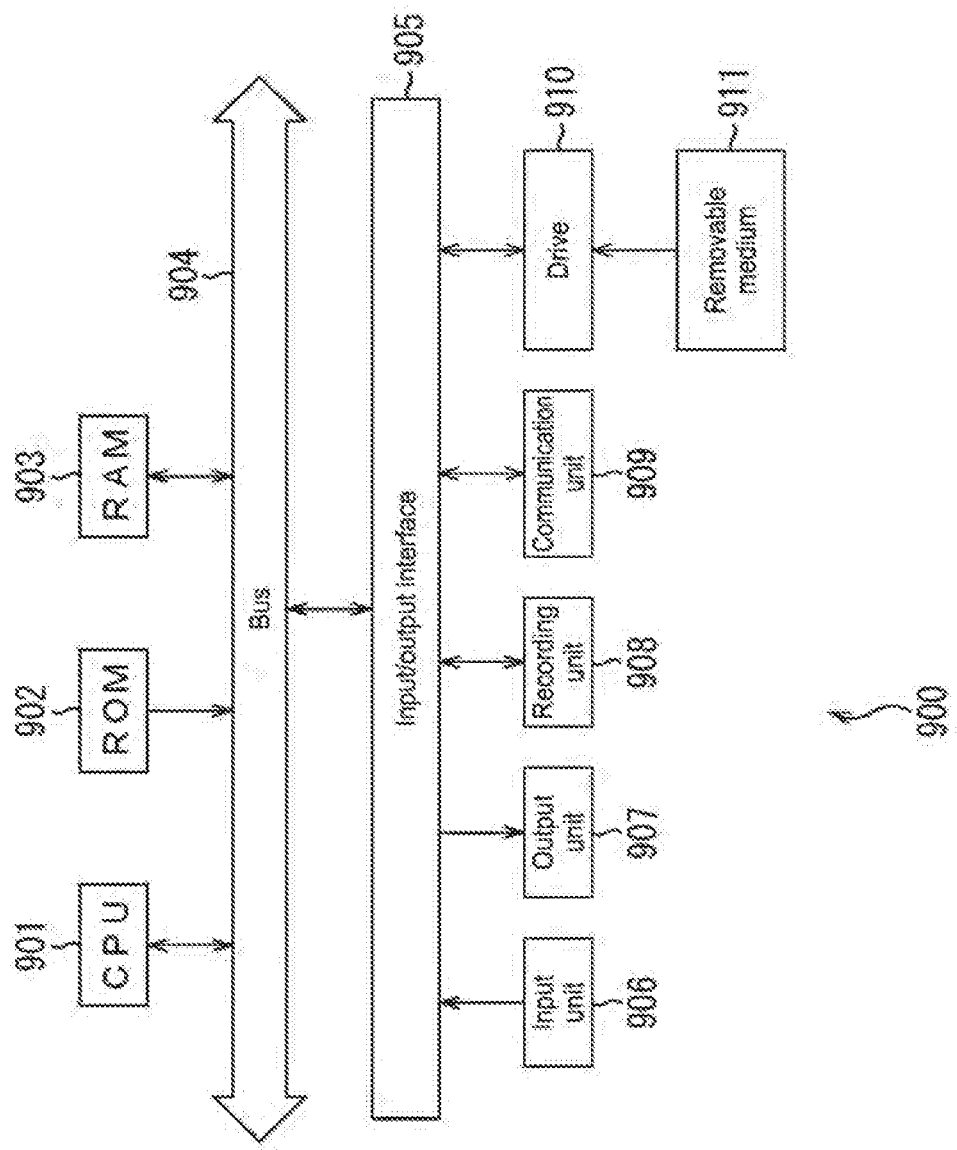

RECEPTION APPARATUS, RECEPTION METHOD, TRANSMISSION APPARATUS, AND TRANSMISSION METHOD FOR INDICATING PRESENCE OR ABSENCE OF SIGNALING INFORMATION IN A PAYLOAD OF A PACKET

TECHNICAL FIELD

The present technology relates to a reception apparatus, a reception method, a transmission apparatus, and a transmission method, more particularly, to a reception apparatus, a reception method, a transmission apparatus, and a transmission method that enable more flexible operations to be performed.

BACKGROUND ART

When a plurality of PLPs (Physical Layer Pipes) can be arranged in a single frequency band, information used for grouping arbitrary PLPs may be specified in digital broadcast standards (see, for example, Non-patent document 1). In Non-patent document 1, for example, a PLP group ID (PLP_GROUP_ID) is specified as signaling information of a physical layer.

Non-patent Document 1: ETSI EN 302 755 V1.2.1 (2010-10)

SUMMARY

Problem to be Solved

Incidentally, when a plurality of PLPs are grouped, there may be PLPs in which signaling information that is transmitted in a higher layer than the physical layer exists and PLPs in which such information does not exist. In this regard, a request has been made for a technology that notifies whether the signaling information exists to enable more flexible operations to be performed.

The present technology has been made in view of the circumstances as described above and aims at enabling more flexible operations to be performed.

Means for Solving the Problem

According to a first aspect of the present technology, there is provided a reception apparatus including: a reception unit that receives a content transmitted in an IP (Internet Protocol) transmission system; an acquisition unit that acquires, based on first control information that is transmitted in a first layer in a protocol stack of the IP transmission system and includes information indicating whether second control information transmitted in a second layer higher than the first layer exists, the second control information; and a control unit that controls operations of the units that process the content based on the second control information.

The reception apparatus according to the first aspect of the present technology may be an independent apparatus or may be an internal block configuring a single apparatus. Moreover, a reception method according to the first aspect of the present technology is a reception method corresponding to the reception apparatus according the first aspect of the present technology described above.

In the reception apparatus and reception method according to the first aspect of the present technology, a content transmitted in the IP transmission system is received, the second control information is acquired based on the first control information that is transmitted in the first layer in the protocol stack of the IP transmission system and includes information indicating whether the second control information transmitted in the second layer higher than the first layer exists, and operations of the units that process the content are controlled based on the second control information.

According to a second aspect of the present technology, there is provided a transmission apparatus including: an acquisition unit that acquires a content transmitted in a IP transmission system; a generation unit that generates first control information that is transmitted in a first layer in a protocol stack of the IP transmission system and includes information indicating whether second control information transmitted in a second layer higher than the first layer exists; and a transmission unit that transmits the first control information and the second control information together with the content according to the IP transmission system.

The transmission apparatus according to the second aspect of the present technology may be an independent apparatus or may be an internal block configuring a single apparatus. Moreover, a transmission method according to the second aspect of the present technology is a transmission method corresponding to the transmission apparatus according to the second aspect of the present technology described above.

In the transmission apparatus and transmission method according to the second aspect of the present technology, a content transmitted in the IP transmission system is acquired, first control information that is transmitted in a first layer in a protocol stack of the IP transmission system and includes information indicting whether second control information transmitted in a second layer higher than the first layer exists is generated, and the first control information and the second control information are transmitted together with the content according to the IP transmission system.

Effects

According to the first and second aspects of the present technology, more flexible operations can be performed.

It should be noted that the effects described herein are not necessarily limited, and any effect described in the present disclosure may be obtained.

BRIEF DESCRIPTION OF DRAWINGS

FIG. 2 A diagram showing an example of a syntax of descriptors according to the present technology.

FIG. 3 A diagram showing a description example of the descriptors according to the present technology.

FIG. 5 A diagram showing a description example of the descriptors of the present technology according to the operation example 1.

FIG. 7 A diagram showing a description example of the descriptors of the present technology according to the operation example 2.

FIG. 9 A diagram showing a description example of L1-post signaling.

FIG. 13 A diagram showing a relationship with the existing technology (ISDB-S).

FIG. 14 A diagram showing a relationship with the existing technology (ISDB-S).

FIG. 19 A diagram showing a configuration example of a computer.

DESCRIPTION OF PREFERRED EMBODIMENTS

Figure 1:
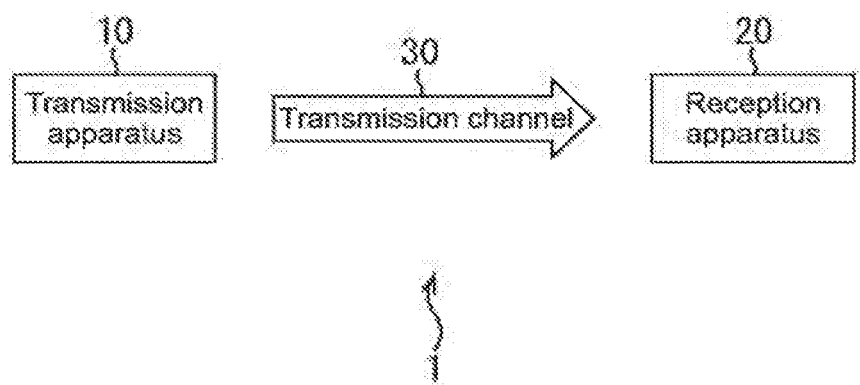
FIG. 1 A diagram showing a configuration of a transmission system according to an embodiment to which the present technology is applied.

Hereafter, an embodiment of the present technology will be described with reference to the drawings. It should be noted that the descriptions will be given in the following order.

1. System configuration
2. General outline of present technology
3. Operation examples
   (1) Operation example 1: Operation example in case where PLP belongs to single PLP group
   (2) Operation example 2: Operation example in case where PLP is shared
4. Signaling transmission method
5. Relationships with existing technologies
6. Configuration of each apparatus
7. Flow of processing executed in respective apparatuses
8. Computer configuration <1. System Configuration>

FIG. 1 is a diagram showing a configuration of a transmission system to which the present technology is applied according to an embodiment. It should be noted that the system refers to a logical group of a plurality of apparatuses.

In FIG. 1, a transmission system 1 is constituted of a transmission apparatus 10 and a reception apparatus 20. In the transmission system 1, data transmissions conforming to a digital broadcast standard such as ATSC (Advanced Television Systems Committee) are performed.

The transmission apparatus 10 transmits contents such as television programs. Specifically, the transmission apparatus 10 transmits, via a transmission channel 30, a stream of (components of) video, audio, and the like configuring a content, as digital broadcasting signals.

The reception apparatus 20 receives the contents such as television programs transmitted from the transmission apparatus 10 via the transmission channel 30 and outputs them. Specifically, the reception apparatus 20 receives the digital broadcasting signals transmitted from the transmission apparatus 10, acquires a stream of (components of) video, audio, and the like configuring a content, and outputs the video and audio of the content.

It should be noted that in addition to the data transmissions conforming to ATSC, the transmission system 1 of FIG. 1 is applicable to data transmissions conforming to standards of DVB (Digital Video Broadcasting), ISDB (Integrated Services Digital Broadcasting), and the like, and other data transmissions. Moreover, in addition to terrestrial broadcasting, satellite connections, cable television networks (wired lines), and the like can be adopted as the transmission channel 30.

<2. General Outline of Present Technology>

Incidentally, in ATSC 3.0 currently being formulated, LLS (Link Layer Signaling) signaling information and SLS (Service Level Signaling) signaling information are specified, and SLS signaling information for each service is acquired according to information described in the LLS signaling information acquired prior to the SLS signaling information.

Here, the LLS signaling information includes, for example, metadata such as FIT (Fast Information Table), EAD (Emergency Alerting Description), and RRD (Region Rating Description). FIT includes information that indicates a configuration of a stream or service in a broadcasting network, such as information requisite for selecting a service. EAD includes information on an emergency alert. RRD includes information on rating.

The SLS signaling information includes, for example, metadata such as USD (User Service Description), MPD (Media Presentation Description), and LSID (LCT Session Instance Description). USD includes information on an acquisition source of other metadata. MPD is control information used for managing reproduction of a component stream. LSID is control information of a ROUTE (Real-time Object Delivery over Unidirectional Transport) protocol.

Also in ATSC 3.0, while various operation forms are assumed as in a case where a plurality of services share a specific component or a case where a plurality of PLPs are grouped, for example, there has been a request to enable more flexible operations to be made by transmitting information indicating whether signaling information exists, and the like in a layer (physical layer) lower than a layer in which the LLS signaling information and SLS signaling information are transmitted so that notification is made precedently.

In the present technology, more flexible operations are enabled by defining descriptors for accommodating such a request (hereinafter, also referred to as descriptors of present technology).

(Syntax of Descriptors of Present Technology)

FIG. 2 is a diagram showing an example of a syntax of the descriptors of the present technology.

6-bit NUM_PLP indicates the number of PLPs that can be arranged in a certain frequency band (e.g., 6-MHz frequency band). A 2-bit reserved area (reserved) is arranged subsequent to NUM_PLP. Subsequent to the reserved area, a PLP loop is repeated according to the number of PLPs indicated by NUM_PLP.

The following contents are set in the PLP loop. Specifically, 1-bit LLS_EXIST_FLAG is a flag that indicates whether LLS signaling information exists in a target PLP. For example, LLS_EXIST_FLAG="1" indicates that the target PLP includes LLS signaling information. Further, 7-bit PLP_GROUP_ID is an ID for identifying a group to which the target PLP belongs.

FIG. 3 shows a specific description example of the descriptors of the present technology.

In ATSC 3.0, a maximum of 64 PLPs can be arranged in one frequency band (e.g., 6-MHz frequency band corresponding to 1 channel). Here, an example where NUM_PLP="64" is set and a value of 0 to 63 is set as PLP_ID for identifying a PLP is shown. Further, LLS_EXIST_FLAG="1" indicates that LLS signaling information exists in the target PLP, and LLS_EXIST_FLAG="0" indicates that LLS signaling information does not exist in the target PLP.

PLP_GROUP_ID is expressed by a bitmap configuration in which a group is allocated to each bit of a 7-bit bit string. Therefore, of the 7 bits, the bits from a least significant bit (LSB: Least Significant Bit) to a most significant bit (MSB: Most Signification Bit) can sequentially be allocated to PLP groups 1 to 7.

In the PLP identified by PLP_ID="0" in FIG. 3, "1" is set as LLS_EXIST_FLAG, and "000 0001" is set as PLP_GROUP_ID. In other words, LLS signaling information exists in the PLP, and this PLP belongs to a PLP group 1.

Moreover, in the PLP identified by PLP_ID="1", "1" is set as LLS_EXIST_FLAG, and "000 0010" is set as PLP_GROUP_ID. In other words, LLS signaling information exists in this PLP, and this PLP belongs to a PLP group 2.

Further, in the PLP identified by PLP_ID="2", "0" is set as LLS_EXIST_FLAG, and "000 0011" is set as PLP_GROUP_ID. In other words, LLS signaling information does not exist in this PLP, and this PLP belongs to both the PLP group 1 and the PLP group 2. That is, it can also be said that the LLP identified by PLP_ID="2" is shared by (PLP identified by PLP_ID="0" in) the PLP group 1 and (PLP identified by PLP_ID="1" in) the PLP group 2.

Furthermore, in the PLP identified by PLP_ID="3", "1" is set as LLS_EXIST_FLAG, and "000 0000" is set as PLP_GROUP_ID. In other words, LLS signaling information exists in this PLP, and this PLP does not belong to a PLP group since it is configured as an independent PLP.

It should be noted that although LLS_EXIST_FLAG and PLP_GROUP_ID with respect to PLPs having PLP_IDs of "4" to "63" are not described in FIG. 3, "1" is set as LLS_EXIST_FLAG if LLS signaling information exists, and bits corresponding to a target PLP group identified by PLP_GROUP_ID expressed by the bitmap configuration are set if the PLP belongs to a PLP group, similar to the PLPs described above. Moreover, although PLP_GROUP_ID is described as 7 bits, a bit count to be allocated to PLP_GROUP_ID is arbitrary. For example, by allocating 15 bits to PLP_GROUP_ID, 15 groups can be set.

3. Operation Examples

Next, specific operation examples that use the descriptors of the present technology will be described.

(1) Operation Example 1

(System Pipe Model)

Figure 4:
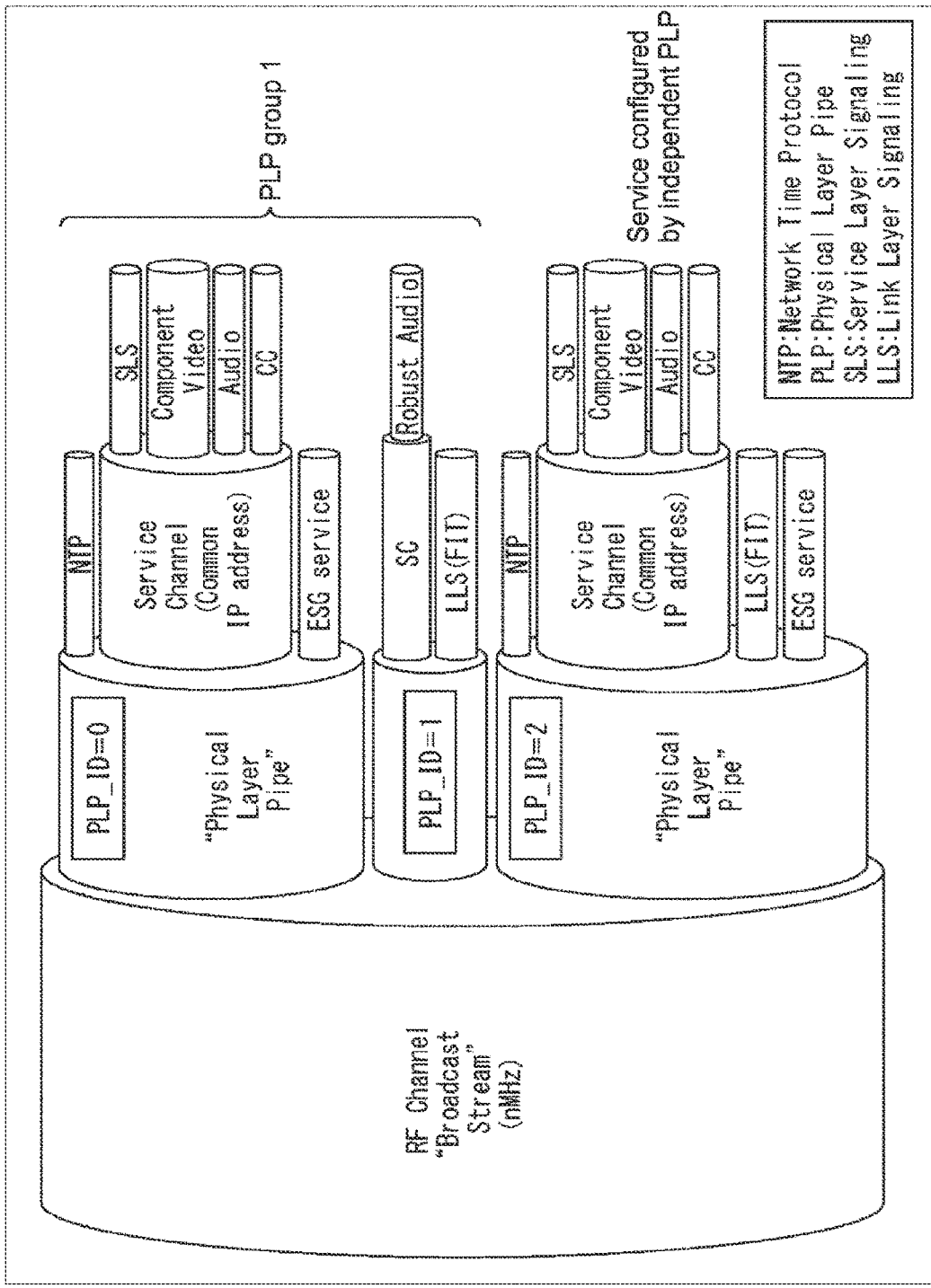
FIG. 4 A diagram showing a system pipe model according to an operation example 1.

FIG. 4 is a diagram showing a system pipe model according to an operation example 1.

In FIG. 4, a PLP whose PLP ID is "0" (PLP 0), a PLP whose PLP is "1" (PLP 1), and a PLP whose PLP ID is "2" (PLP 2) are transmitted in broadcast waves including a predetermined frequency band (e.g., 6 MHz) (RF Channel). Of the three PLPs, streams of an NTP (Network Time Protocol), a service channel (service), and an ESG (Electronic Service Guide) service are transmitted in the PLP 0.

In the PLP 0, the stream of a service channel is constituted of streams of SLS signaling information and video, audio, and subtitle. The SLS signaling information is signaling information set for each service, such as USD and MPD. In addition, a content A (e.g., television program) provided by the service channel is configured by components of the video, audio, and subtitle. It should be noted that NTP is time information, and the ESG service is an electronic service guide.

In the PLP 1 shown in FIG. 4, streams of the service channel (service) and LLS signaling information are transmitted. The stream of the service channel is constituted of a robust audio stream having high robustness. The LLS signaling information is signaling information that does not depend on a specific service, such as FIT.

Here, the PLP whose PLP ID is "0" (PLP 0) and the PLP whose PLP ID is "1" (PLP 1) belong to the same PLP group 1. Specifically, since the stream of LLS signaling information is transmitted by the PLP 1 in the PLP group 1, the reception apparatus 20 can acquire FIT from that stream of LLS signaling information so as to store it as selection information. Moreover, when the content A is selected, the reception apparatus 20 can acquire SLS signaling information transmitted by the PLP 0 according to bootstrap information described in the selection information (FIT).

Then, by acquiring the streams of the video, audio, and subtitle based on the SLS signaling information in the PLP 0, the reception apparatus 20 can reproduce the content A in the PLP 0. Here, since the robust audio stream is transmitted by the stream of the service channel in the PLP 1, robust audio in the PLP 1 may be reproduced in place of the audio in PLP 0.

Although the PLP whose PLP ID is "0" (PLP 0) and the PLP whose PLP ID is "1" (PLP 1) belong to the same PLP group 1 as described above, the LLS signaling information is transmitted in the PLP 1, and the SLS signaling information is transmitted in the PLP 0. In other words, the LLS signaling information and SLS signaling information are transmitted in different PLPs.

Further, streams of the NTP, service channel (service), LLS signaling information, and ESG service are transmitted in the PLP 2 shown in FIG. 4. In the PLP 2, the stream of the service channel is constituted of streams of SLS signaling information and video, audio, and subtitle. A content B (e.g., television program) provided by the service channel is configured by components of the video, audio and subtitle.

Here, the PLP whose PLP ID is "2" (PLP 2) does not belong to the PLP group and is configured as an independent PLP. Specifically, since the stream of LLS signaling information is transmitted in the PLP 2 that does not belong to the PLP group, the reception apparatus 20 can acquire FIT from that stream of LLS signaling information so as to store it as selection information. Moreover, when the content B is selected, the reception apparatus 20 can acquire SLS signaling information transmitted by the PLP 2 according to bootstrap information described in the selection information (FIT).

Then, by acquiring the streams of the video, audio, and subtitle based on the SLS signaling information in PLP 2, the reception apparatus 20 can reproduce the content B in the PLP 2.

Since the PLP whose PLP ID is "2" (PLP 2) is configured as an independent PLP that does not belong to the PLP group as described above, the LLS signaling information and the SLS signaling information are both transmitted in the PLP 2. In other words, the LLS signaling information and the SLS signaling information are transmitted in the same PLP.

Description Example of Descriptors of Present Technology

Regarding the system pipe model of the operation example 1 having the configuration as described above (FIG. 4), the presence/absence of LLS signaling information and belonging to a PLP group are expressed as shown in FIG. 5 for each PLP identified by the PLP ID using the descriptors of the present technology.

Since (a stream of) LLS signaling information is not transmitted in the PLP whose PLP ID is "0" (PLP 0) in FIG. 5, "0" is set as LLS_EXIST_FLAG. On the other hand, since (a stream of) LLS signaling information is transmitted in the PLP whose PLP ID is "1" (PLP 1) and the PLP whose PLP ID is "2" (PLP 2), "1" is set as LLS_EXIST_FLAG.

Moreover, since the PLP whose PLP ID is "0" (PLP 0) and the PLP whose PLP ID is "1" (PLP 1) belong to the same PLP group 1, "000 0001" that indicates that the PLP belongs to the PLP group 1 is set as PLP_GROUP_ID of each of the PLPs. On the other hand, since the PLP whose PLP ID is "2" (PLP 2) does not belong to the PLP group and is an independent PLP, "000 0000" is set as PLP_GROUP_ID.

It should be noted that in the system pipe model of the operation example 1 shown in FIG. 4, only the three PLPs (PLP 0 to PLP 2) are transmitted. Therefore, information on the PLPs having PLP_IDs "3" to "63" does not need to be described.

As described above, in the operation example 1, by transmitting the descriptors of the present technology shown in FIG. 5 in a physical layer of a protocol stack of ATSC 3.0, the reception apparatus 20 can recognize that, at a time point the descriptors of the present technology shown in FIG. 5 are acquired, the LLS signaling information is transmitted in the PLP 1 out of the PLPs 0 and 1 belonging to the PLP group 1, for example. As a result, more flexible operations can be made with respect to various operation forms as in a case where a plurality of service channels (services) share a specific component or a case where a plurality of PLPs are grouped, for example. Further, since the reception apparatus 20 can recognize the presence of signaling information transmitted in a higher layer than the physical layer at a time point the descriptors of the present technology shown in FIG. 5 are acquired, the reception apparatus 20 can readily acquire the target signaling information and shorten a processing time.

(2) Operation Example 2

(System Pipe Model)

Figure 6:
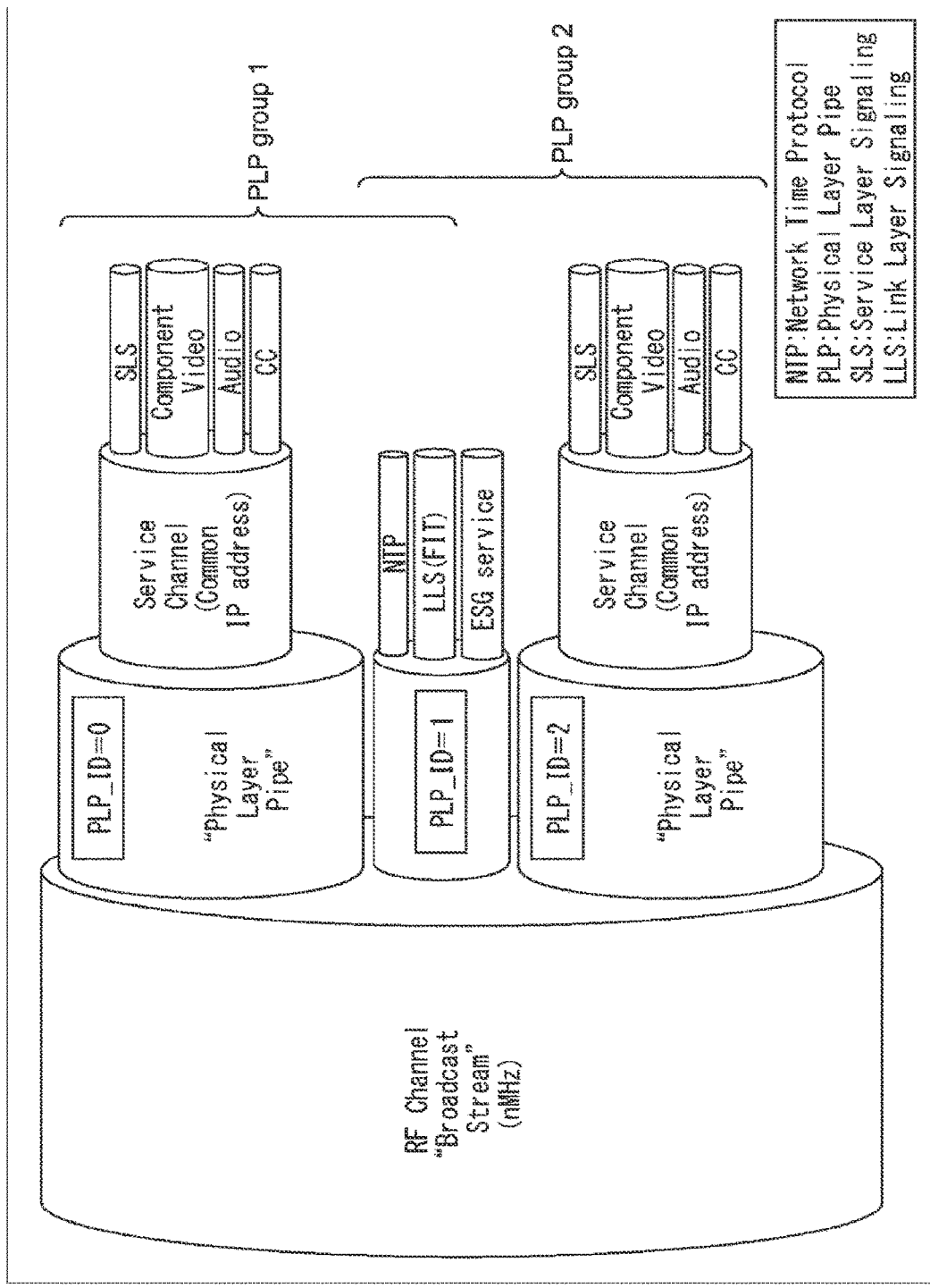
FIG. 6 A diagram showing a system pipe model according to an operation example 2.

FIG. 6 is a diagram showing a system pipe model according to an operation example 2.

In FIG. 6, the PLP whose PLP ID is "0" (PLP 0), the PLP whose PLP ID is "1" (PLP 1), and the PLP whose PLP ID is "2" (PLP 2) are transmitted in broadcast waves including a predetermined frequency band (e.g., 6 MHz) (RF Channel). Of the three PLPs, a stream of a service channel (service) is transmitted in the PLP 0.

In the PLP 0, the stream of the service channel is constituted of streams of SLS signaling information and video, audio, and subtitle. Specifically, a content C (e.g., television program) provided by the service channel is configured by components of the video, audio, subtitle, and the like.

In the PLP 1 shown in FIG. 6, streams of the NTP, LLS signaling information, and ESG service are transmitted.

Here, the PLP whose PLP ID is "0" (PLP 0) and the PLP whose PLP ID is "1" (PLP 1) belong to the same PLP group 1. Specifically, since the stream of LLS signaling information is transmitted by the PLP 1 in the PLP group 1, the reception apparatus 20 can acquire FIT from that stream of LLS signaling information so as to store it as selection information.

Moreover, when the content C is selected, the reception apparatus 20 can acquire SLS signaling information transmitted by the PLP 0 according to bootstrap information described in the selection information (FIT). Then, by acquiring the streams of the video, audio, and subtitle based on the SLS signaling information in the PLP 0, the reception apparatus 20 can reproduce the content C in the PLP 0.

Although the PLP whose PLP ID is "0" (PLP 0) and the PLP whose PLP ID is "1" (PLP 1) belong to the same PLP group 1 as described above, the LLS signaling information is transmitted in the PLP 1, and the SLS signaling information transmitted in the PLP 0. In other words, the LLS signaling information and the SLS signaling information are transmitted in different PLPs.

Further, the stream of the service channel (service) is transmitted in the PLP 2 shown in FIG. 6. In the PLP 2, the stream of the service channel is constituted of streams of SLS signaling information and the video, audio, and subtitle. Specifically, a content D (e.g., television program) provided by the service channel is configured by components of the video, audio, subtitle, and the like.

Here, the PLP whose PLP ID is "2" (PLP 2) and the PLP whose PLP ID is "1" (PLP 1) belong to the same PLP group 2. Specifically, since the stream of LLS signaling information is transmitted in the PLP 1 in the PLP group 2, the reception apparatus 20 can acquire FIT from that stream of LLS signaling information so as to store it as selection information.

Moreover, when the content D is selected, the reception apparatus 20 can acquire SLS signaling information transmitted by the PLP 2 according to bootstrap information described in the selection information (FIT). Then, by acquiring the streams of the video, audio, and subtitle based on the SLS signaling information in the PLP 2, the reception apparatus 20 can reproduce the content D in the PLP 2.

Although the PLP whose PLP ID is "2" (PLP 2) and the PLP whose PLP ID is "1" (PLP 1) belong to the same PLP group 2 as described above, the LLS signaling information is transmitted in the PLP 1, and the SLS signaling information is transmitted in the PLP 2. In other words, the LLS signaling information and the SLS signaling information are transmitted in different PLPs. Moreover, since the PLP 1 also belongs to the PLP group 1 with the PLP 0 as described above, the LLS signaling information used in both the PLP group 1 and the PLP group 2 is transmitted in the PLP 1. In other words, the PLP 1 as a PLP that is shared by (the PLP 0 of) the PLP group 1 and (the PLP 2 of) the PLP group 2.

Description Example of Descriptors of Present Technology

Regarding the system pipe model of the operation example 2 having the configuration as described above (FIG. 6), the presence/absence of LLS signaling information and belonging to a PLP group are expressed as shown in FIG. 7 for each PLP identified by the PLP ID using the descriptors of the present technology.

Since (a stream of) LLS signaling information is not transmitted in the PLP whose PLP ID is "1" (PLP 0) and the PLP whose PLP ID is "2" (PLP 2) in FIG. 7, "0" is set as LLS_EXIST_FLAG. On the other hand, since (a stream of) LLS signaling information is transmitted in the PLP whose PLP ID is "1" (PLP 1) is set as LLS_EXIST_FLAG.

Moreover, since the PLP whose PLP ID is "0" (PLP 0) and the PLP whose PLP ID is "1" (PLP 1) belong to the same PLP group 1, "000 0001" that indicates that the PLP belongs to the PLP group 1 is set as PLP_GROUP_ID of the PLP 0, and "000 0011" that indicates that the PLP belongs to the PLP group 1 is set as PLP_GROUP_ID of the PLP 1. Specifically, in PLP_GROUP_ID of each of the PLPs 0 and 1, a least significant bit (LSB) that indicates that the PLP belongs to the PLP group 1 is described.

On the other hand, since the PLP whose PLP ID is "1" (PLP 1) and PLP whose PLP ID is "2" (PLP 2) belong to the same PLP group 2, "000 0011" that indicates that the PLP belongs to the PLP group 2 is set as PLP_GROUP_ID of the PLP 1, and "000 0010" that indicates that the PLP belongs to the PLP group 2 is set as PLP_GROUP_ID of the PLP 2. Specifically, in PLP_GROUP_ID of each of the PLPs 1 and 2, a second bit from the right that indicates that the PLP belongs to the PLP group 2 is described.

It should be noted that in the system pipe model of the operation example 2 shown in FIG. 6, only the three PLPs (PLP 0 to PLP 2) are transmitted. Therefore, information on the PLPs having PLP_IDs "3" to "63" does not need to be described.

As described above, in the operation example 2, by transmitting the descriptors of the present technology shown in FIG. 7 in a physical layer of a protocol stack of ATSC 3.0, the reception apparatus 20 can recognize that, at a time point the descriptors of the present technology shown in FIG. 7 are acquired, the LLS signaling information is transmitted in the PLP 1 that belongs to (shared by) both the PLP group 2 and the PLP group 2, for example. As a result, more flexible operations can be made with respect to various operation forms as in a case where a plurality of service channels (services) share a specific component or a case where a plurality of PLPs are grouped, for example. Further, since the reception apparatus 20 can recognize the presence of signaling information transmitted in a higher layer than the physical layer at a time point the descriptors of the present technology shown in FIG. 7 are acquired, the reception apparatus 20 can readily acquire the target signaling information and shorten a processing time.

<4. Signaling Transmission Method>
(Frame Configuration)

Figure 8:
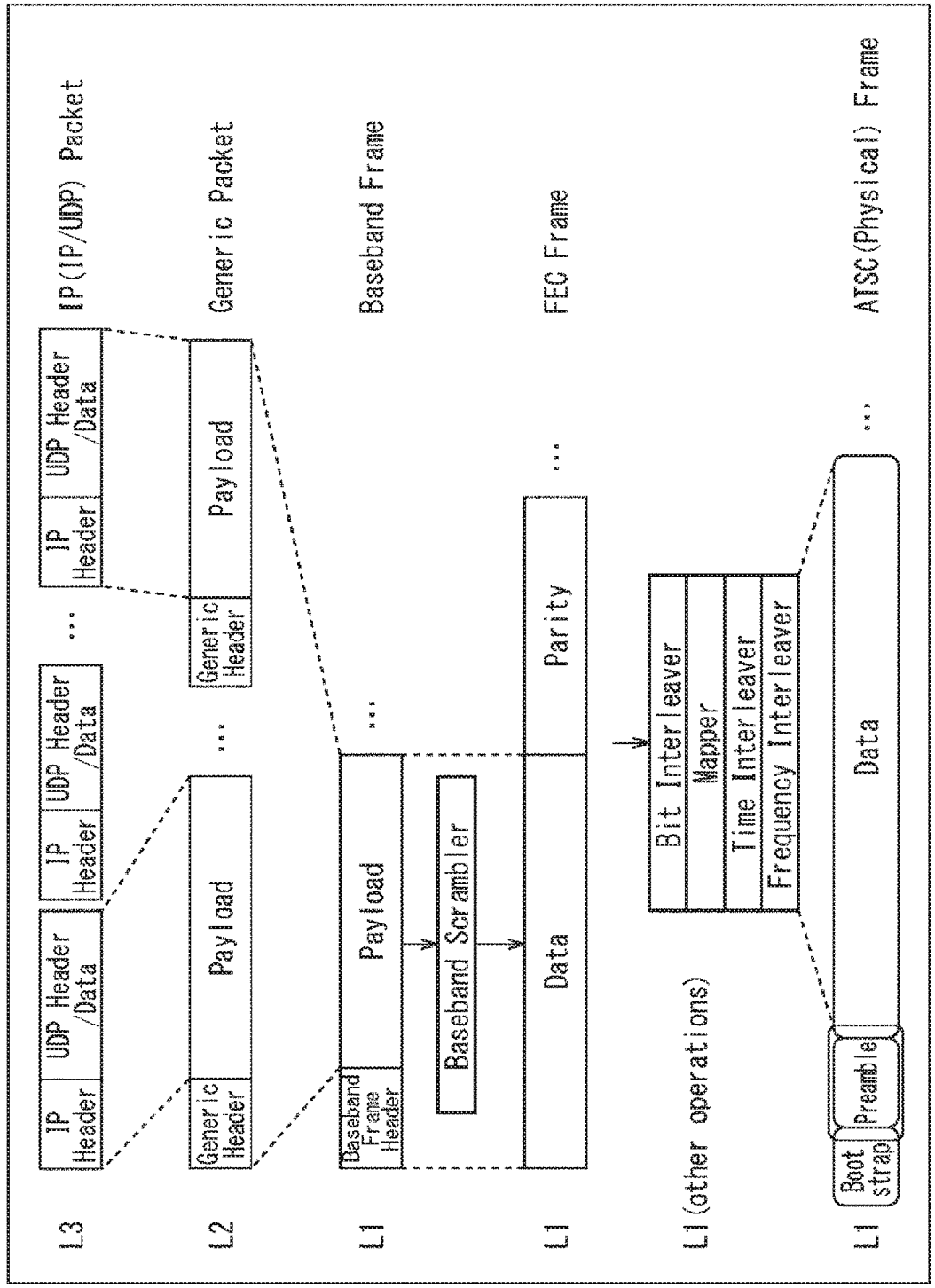
FIG. 8 A diagram showing an example of a physical layer frame configuration.

FIG. 8 is a diagram showing an example of a physical layer frame configuration conforming to ATSC 3.0, that is transmitted in the transmission system 1 shown in FIG. 1. It should be noted that in ATSC 3.0, UDP/IP, that is, an IP (Internet Protocol) packet including a UDP (User Datagram Protocol) packet will be used for data transmission instead of a TS (Transport Stream) packet. Also in broadcasting systems excluding ATSC 3.0, an IP transmission system that uses IP packets is expected to be used in the future.

As shown in FIG. 8, an IP packet (IP Packet) is transmitted in a layer 3 (L3). The IP packet is constituted of an IP header (IP Header), a UDP header (UDP Header), and data (Data). In the data of the IP packet, data of (components of) video, audio, and the like, signaling information, and the like are arranged. Further, a Generic packet (Generic Packet) as a transmission packet is transmitted in a layer 2 (L2). The Generic packet is constituted of a Generic header (Generic Header) and a payload (Payload). One or a plurality of IP packets is/are arranged in the payload of the generic packet and encapsulated (encapsulation).

A BB frame (Baseband Frame) of the layer 1 (L1) corresponding to the physical layer is constituted of a BB frame header (Baseband Frame Header) and a payload (Payload). A plurality of Generic packets are arranged in the payload of the BB frame and encapsulated. Also in the layer 1, data (Data) obtained by scrambling a plurality of BB frames is mapped onto a FEC frame (FEC Frame), and an error correction parity (Parity) of the physical layer is added.

A physical layer frame of the layer 1 (L1) (ATSC (Physical) Frame) is constituted of a bootstrap (Bootstrap), a preamble (Preamble), and a data section (Data). Mapped onto the data section of the physical layer frame is data obtained by carrying out mapping processing after carrying out bit interleave on a plurality of FEC frames and further carrying out processing of the physical layer, such as interleave in a time direction and a frequency direction.

Here, the descriptors of the present technology described above (FIG. 2) can be arranged in the preamble of the physical layer frame. For example, while L1-post signaling information is arranged in the preamble, contents of the descriptors of the present technology can be described therein.

Specifically, in the L1-post signaling information shown in FIG. 9 conforming to ATSC 3.0, 1-bit LLS_EXIST_FLAG and 7-bit PLP_GROUP_ID that are specified by the descriptors of the present technology, are arranged in place of 6-bit PLP_GROUP_ID arranged in a PLP loop. As a result, information that indicates the presence/absence of LLS signaling information and belonging to a PLP group for each PLP identified by the PLP ID is transmitted as signaling of the physical layer.

It should be noted that although the case where the contents of the descriptors of the present technology are arranged in the PLP loop of L1-post signaling information is shown in FIG. 9, the arrangement in the L1-post signaling information is a mere example, and the contents may be arranged in other places.

<5. Relationships with Existing Technologies>
(Relationship with DVB-NGH)

Figure 10:
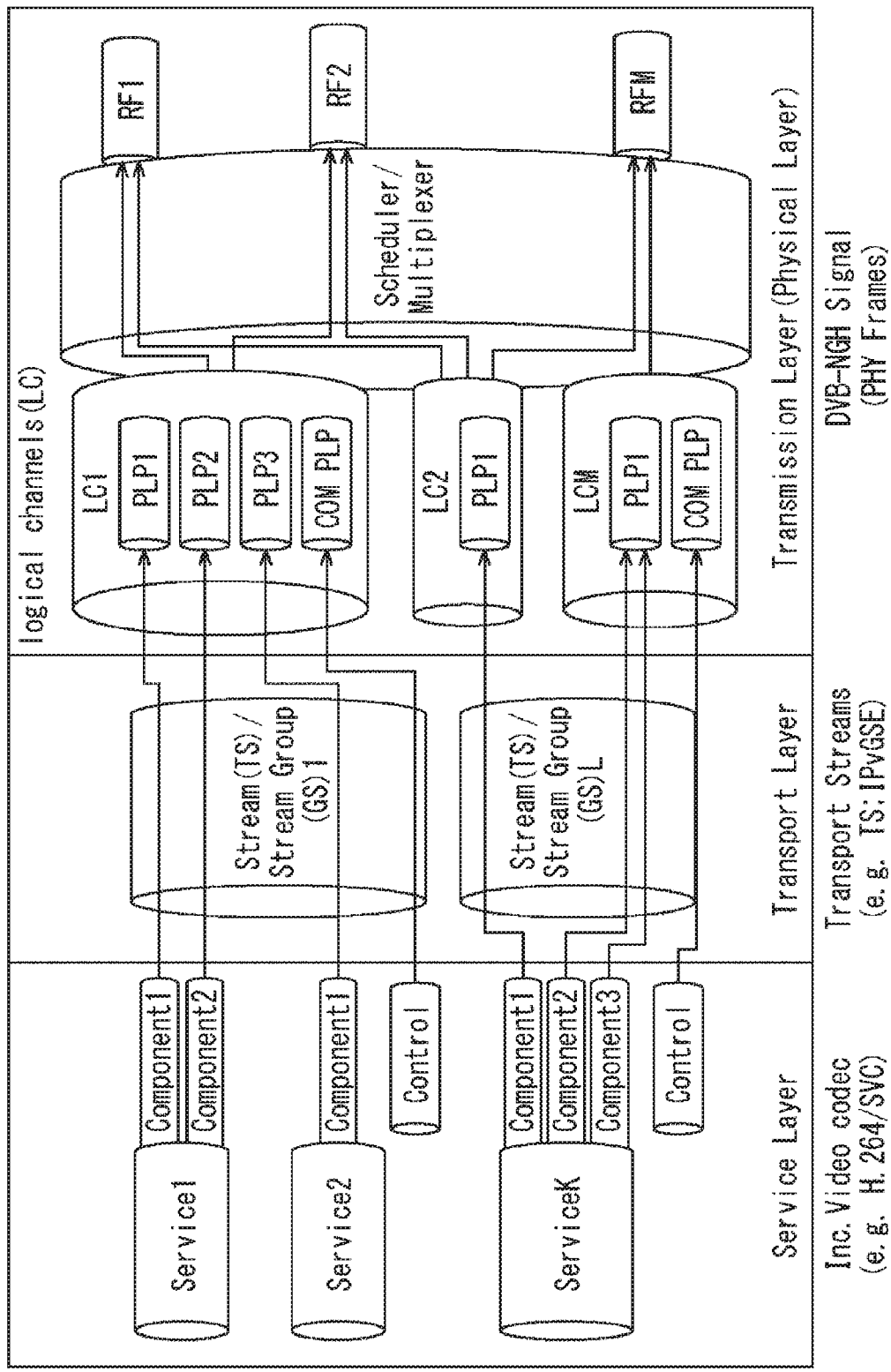
FIG. 10 A diagram showing a relationship with an existing technology (DVB-NGH).

FIG. 10 in a diagram showing a relationship with DVB-NGH.

As shown in the "logical channels" if FIG. 10, in DVB-NGH, STREAM_GROUP_ID is specified so as to enable PLPs to be grouped (PLP cluster), but the PLPs cannot be shared across a plurality of PLP groups. Further, there is no rule for notifying whether signaling information exists in a higher layer than the physical layer.

It should be noted that the specific contents of DVB-NGH are disclosed Non-patent Document 2 below. Also in DVB-NGH, information corresponding to 1-bit LLS_EXIST_FLAG and 7-bit PLP_GROUP_ID, that is specified by the descriptors of the present technology (FIG. 2), can be arranged in signaling information of the physical layer. Accordingly, information that expresses the presence/absence of signaling information in a higher layer than the physical layer and belonging to a PLP group for each PLP identified by the PLP ID can be transmitted as the signaling information of the physical layer.

Non-Patent Document 2: DVB Document A160
(Relationship with DVB-T2)

Figure 11:
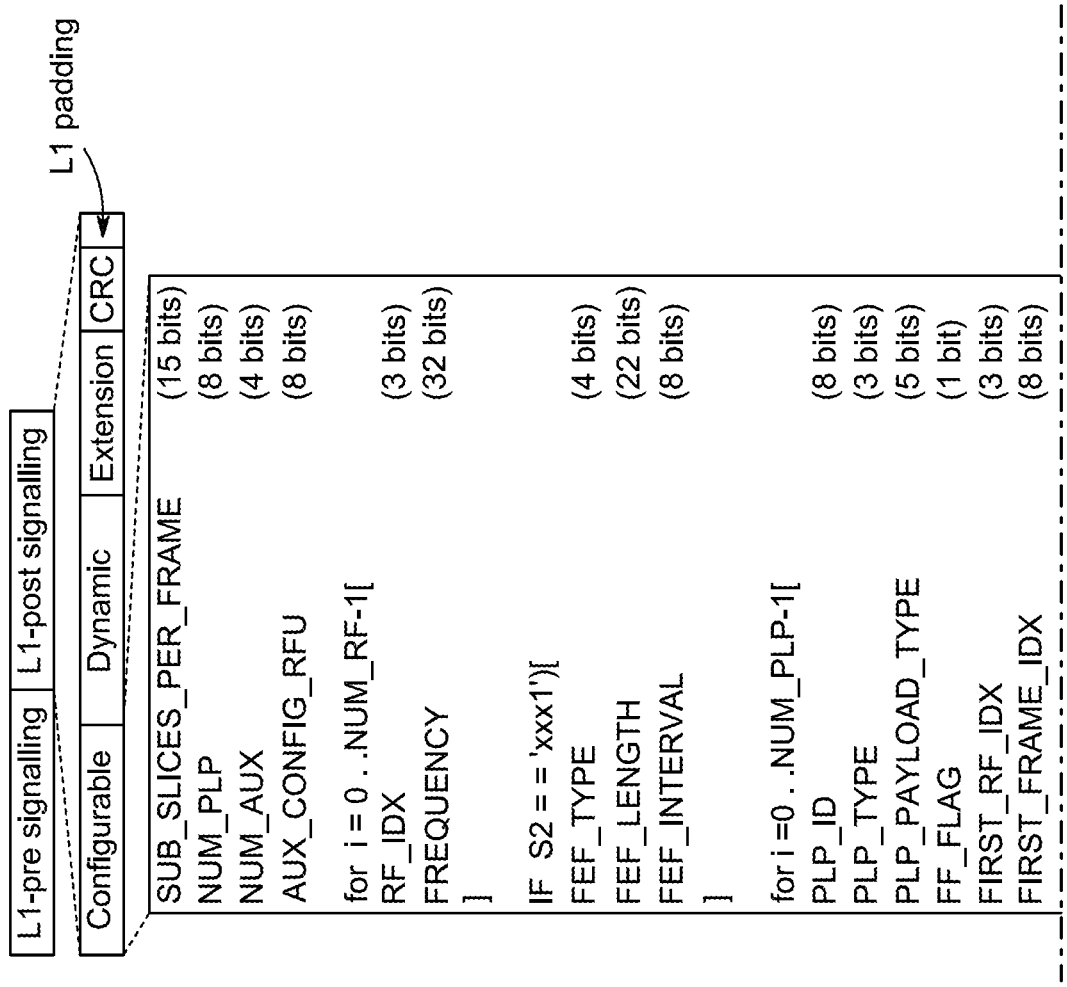
FIG. 11 A diagram showing a relationship with an existing technology (DVB-T2).

FIG. 11 is a diagram showing a relationship with DVB-T2.

In L1-post signaling information specified by DVB-T2 in FIG. 11, 8-bit PLP_GROUP_ID is arranged in a PLP group. This PLP_GROUP_ID is used for associating Data PLPs having the same PLP_GROUP_ID and a Common PLP. Therefore, in current DVB-T2, there is no rule for notifying the presence/absence of signaling information in a higher layer than the physical layer and a PLP that be shared across a plurality of PLP groups.

In this regard, also in L1-post signaling information specified by DVB-T2, 1-bit LLS_EXIST_FLAG and 7-bit PLP_GROUP_ID, that are specified by the descriptors of the present technology (FIG. 2), are arranged in place of PLP_GROUP_ID in a PLP loop. Accordingly, information that expresses the presence/absence of signaling information in a higher layer than the physical layer and belonging to a PLP group for each PLP identified by the PLP ID can be transmitted as the signaling information of the physical layer.

It should be noted that the specific contents of L1-post signaling information specified by DVB-T2 are disclosed in Non-patent Document 1 described above. As in DVB-T2, the L1-post signaling information is applicable to transmission under DVB-C2 (ETSI EN 302 769) and an ultra-high definition cable television standard that is currently being formulated based on DVB-C2.

(Relationship with ISDB-S)

Figure 12:
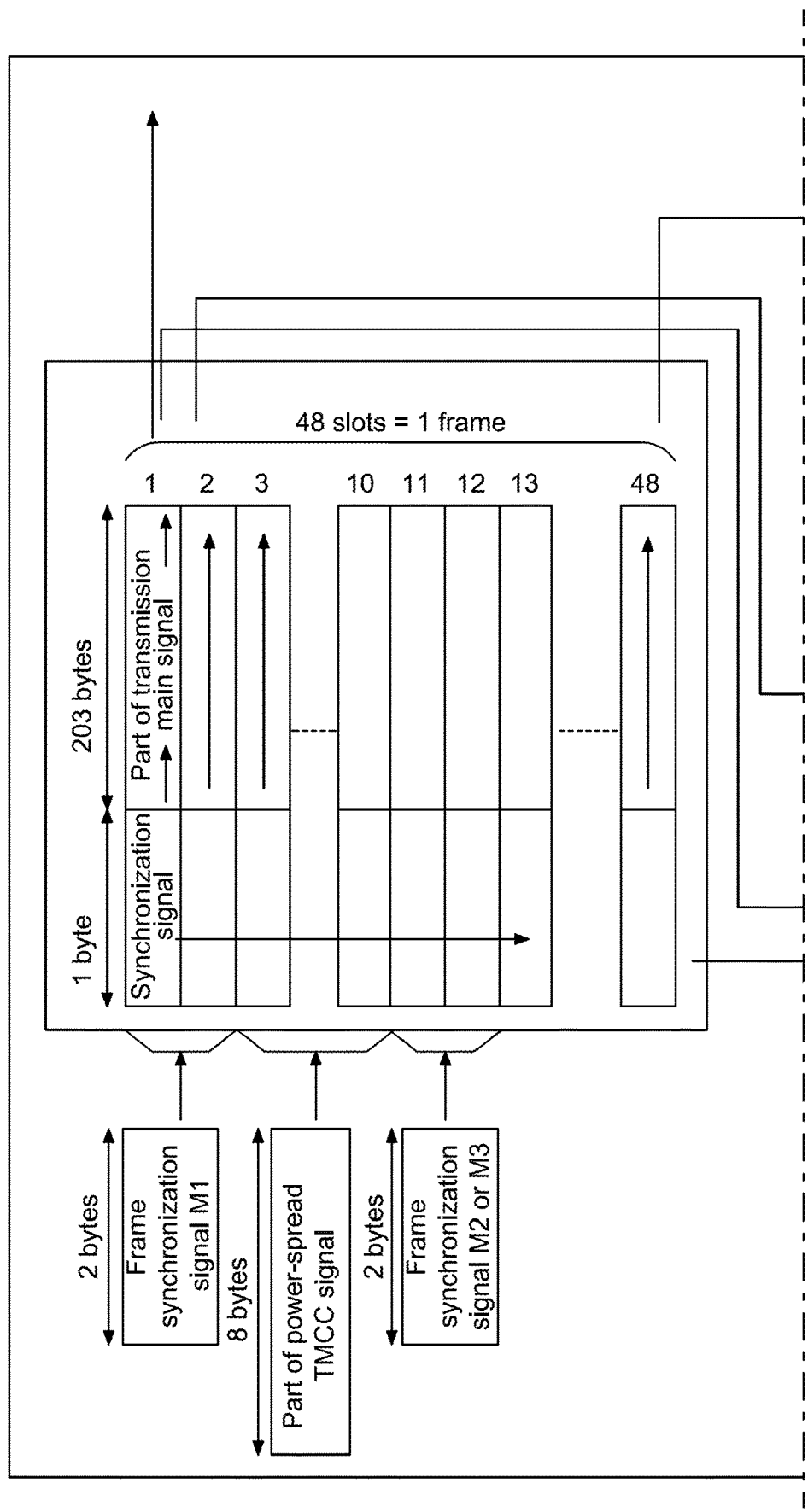
FIG. 12 A diagram showing a relationship with an existing technology (ISDB-S).
Figure 12:
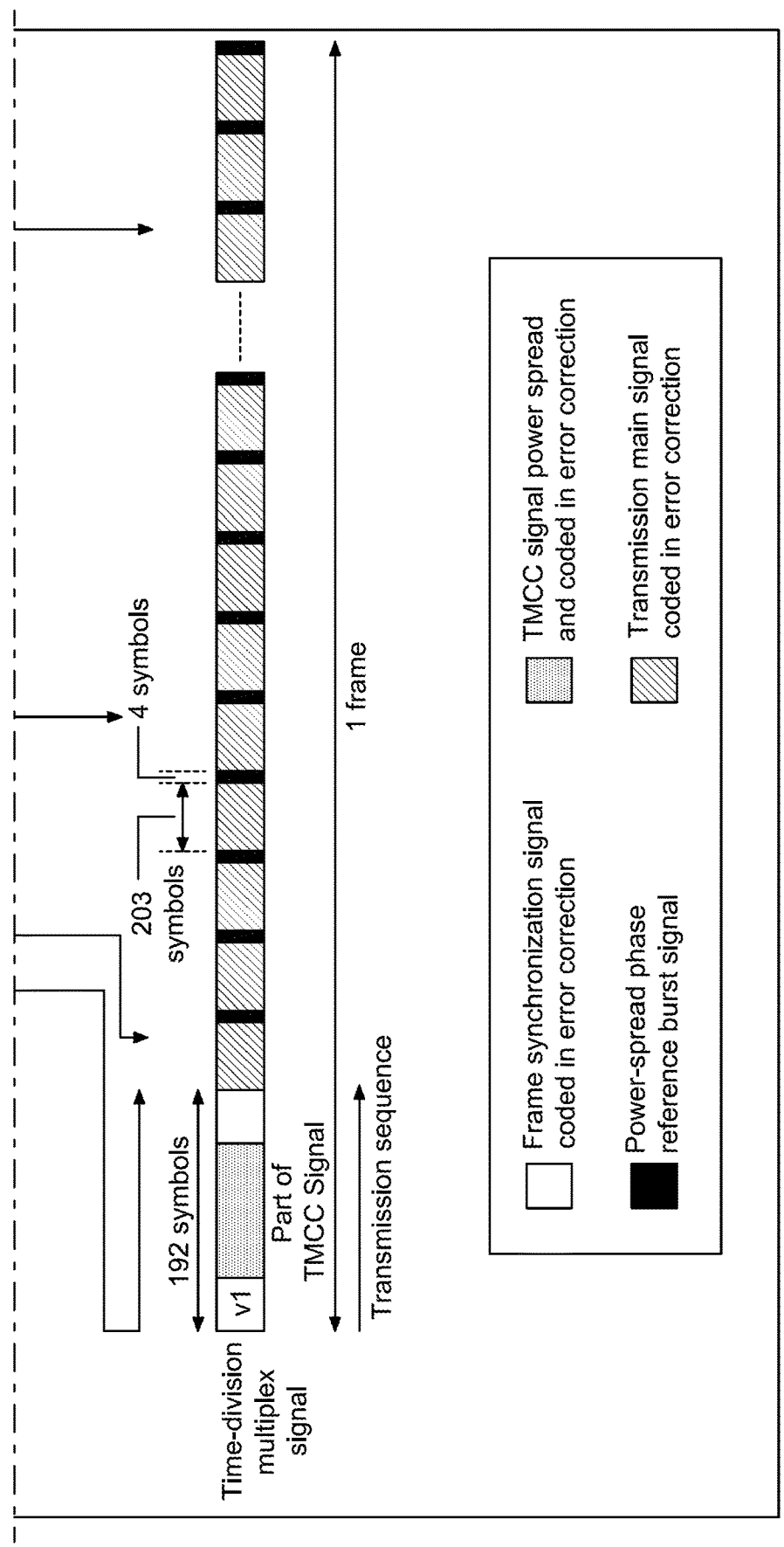

FIG. 12 is a diagram showing a relationship with ISDB-S.

As shown in FIG. 12, 46 slots are specified as one frame in ISDB-S, and the slots are grouped based on relative TS/slot information shown in FIG. 13 and a relative TS/TS_ID correspondence table shown in FIG. 14. Specifically, in FIG. 13, the slots each belong to the same group as other slots having the same relative TS number. Moreover, the relative TS number is associated with TS_ID based on the relative TS/TS_ID correspondence table shown in FIG. 14.

Although the slots can be grouped in ISDB-S, the slots cannot be shared across a plurality of groups. Further, there is also no rule for notifying whether signaling information exists in a higher layer than the physical layer.

It should be noted that the specific contents of ISDB-S are disclosed in Non-patent Document 3 below. Also in ISDB-S, information corresponding 1-bit LLS_EXIST_FLAG and 7-bit PLP_GROUP_ID, that is specified by the descriptors of the present technology (FIG. 2), can be arranged in the signaling information of the physical layer. Accordingly, information that expresses the presence/absence of signaling information in a higher layer than the physical layer and belonging to a group can be transmitted as signaling information of the physical layer.

Non-patent Document 3: "ARIB STD-B20 Version 3.0", Association of Radio Industries and Businesses <6. Configuration of Each Apparatus>

Next, specific configurations of the transmission apparatus 10 and the reception apparatus 20 constituting the transmission system 1 shown in FIG. 1 will be described.

(Configuration of Transmission Apparatus)

Figure 15:
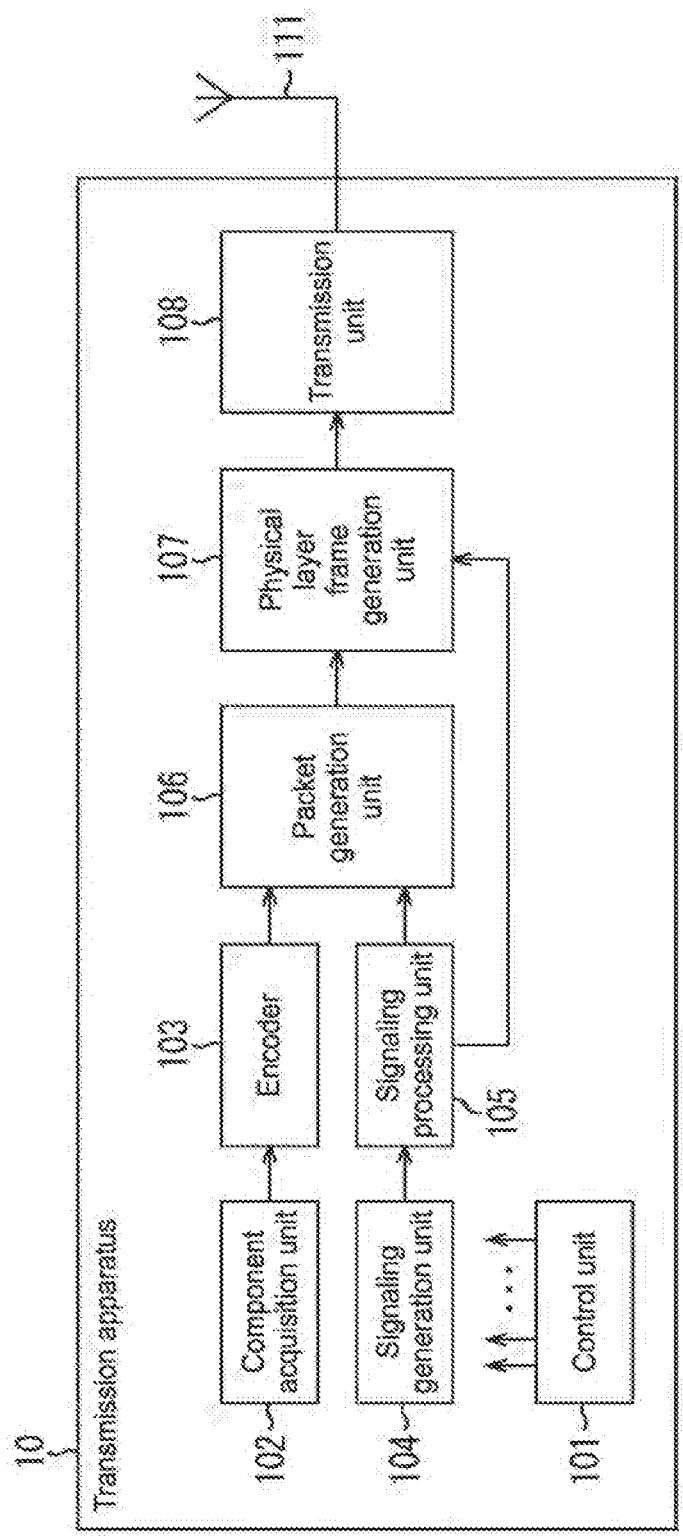
FIG. 15 A diagram showing a configuration example of a transmission apparatus.

FIG. 15 is a diagram showing a configuration example of the transmission apparatus 10 shown in FIG. 1.

In FIG. 15, the transmission apparatus 10 is constituted of a control unit 101, a component acquisition unit 102, and encoder 103, a signaling generation unit 104, a signaling processing unit 105, a packet generation unit 106, a physical layer frame generation unit 107, and a transmission unit 108.

The control unit 101 controls operations of the respective units of the transmission apparatus 10.

The component acquisition unit 102 acquires data of (components of) video, audio, subtitle, and the like constituting a content provided by a specific service (e.g., television program) and supplies the data to the encoder 103. The encoder 103 encodes the data of (components of) the video, audio, and the like supplied from the component acquisition unit 102 by a predetermined encoding method and supplies the encoded data to the packet generation unit 106.

It should be noted that as the content, for example, a relevant content is acquired from a storage area for already-recorded contents based on a broadcast time slot or a live content is acquired from a studio or a location.

The signaling generation unit 104 acquires raw data for generating signaling information from an external server, a built-in storage, or the like. Using the raw data of signaling information, the signaling generation unit 104 generates signaling information.

Here, L1-post signaling information, LLS signaling information, SLS signaling information, and the like are generated as the signaling information. Of the signaling information, the LLS signaling information and the SLS signaling information are supplied to the packet generation unit 106, and the L1-post signaling information is supplied to the physical layer frame generation unit 107.

It should be noted that in the L1-post signaling information, information that expresses the presence/absence of LLS signaling information and belonging to a PLP group (LLS_EXIST_FLAG, PLP_GROUP_ID), that is specified as the descriptors of the present technology (FIG. 2), is arranged in a PLP loop, for example.

The packet generation unit 117 generates an IP packet using the data of (components of) the video, audio, and the like supplied from the encoder 103 and SLS signaling information supplied from the signaling processing unit 105. The packet generation unit 106 also generates a Generic packet by encapsulating one or a plurality of IP packets and supplies it to the physical layer frame generation unit 107. It should be noted that the LLS signaling information supplied from the signaling processing unit 105 can be arranged in a payload of the Generic packet.

The physical layer frame generation unit 107 generates a physical layer frame by encapsulating the plurality of Generic packets supplied from the packet generation unit 106 and supplies it to the transmission unit 108. It should be noted that the L1-post signaling information supplied from the signaling processing unit 105 is arranged in a preamble constituting the physical layer frame.

The transmission unit 106 carries out processing of, for example OFDM (Orthogonal Frequency Division Multiplexing) modulation, on the physical layer frame supplied from the physical layer frame generation unit 107 and transmits the processed frame as digital broadcasting signals via an antenna 111.

It should be noted that in the transmission apparatus 10 shown in FIG. 15, all the functional blocks do not need to be physically arranged in a single apparatus and at least a part of the functional blocks may be structured as an apparatus physically independent from the other functional blocks.

(Configuration of Reception Apparatus)

Figure 16:
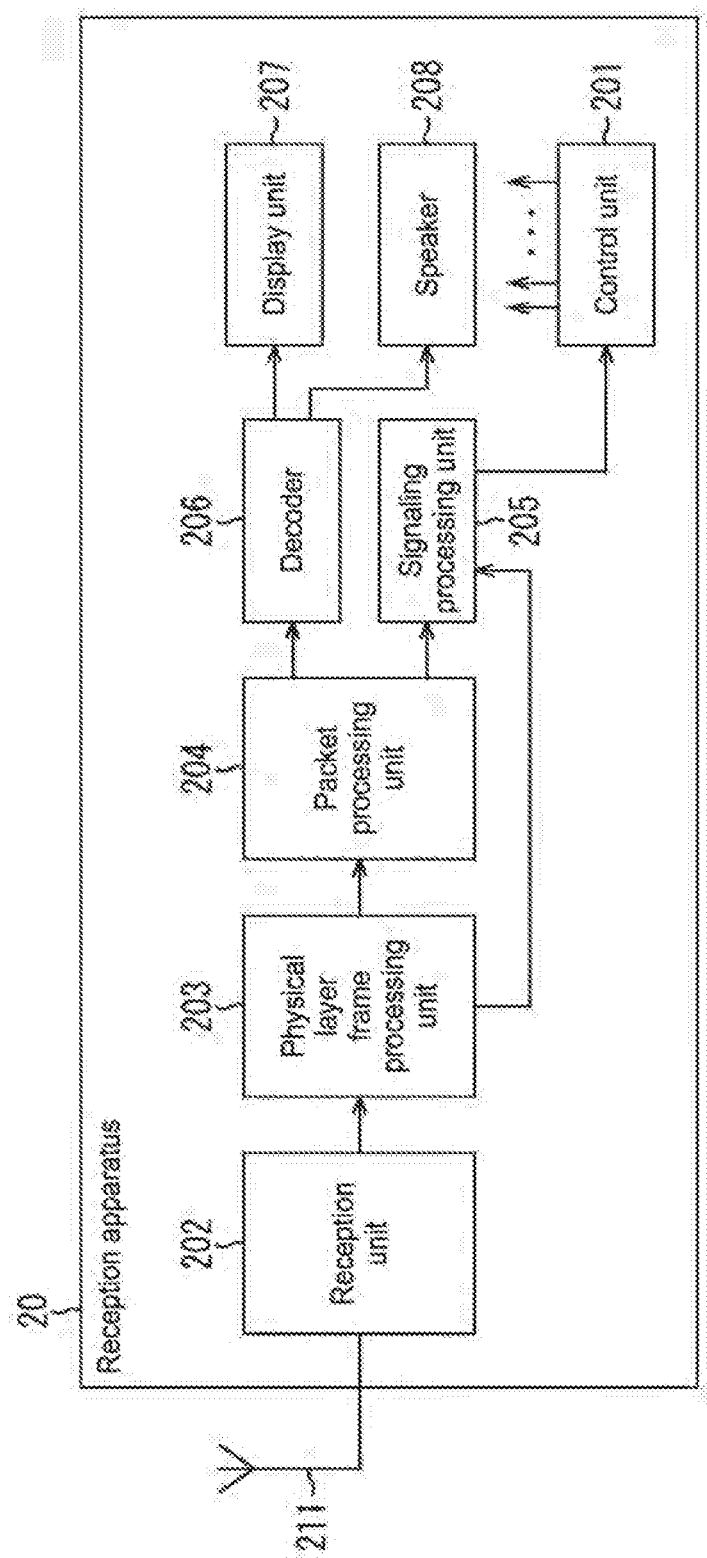
FIG. 16 A diagram showing a configuration example of a reception apparatus.

FIG. 16 is a diagram showing a configuration example of the reception apparatus 20 shown in FIG. 1.

In FIG. 16, the reception apparatus 20 is constituted of a control unit 201, a reception unit 202, a physical layer frame processing unit 203, a packet processing unit 204, a signaling processing unit 205, a decoder 206, a display unit 207, and a speaker 208.

The control unit 201 controls operations of the respective units of the reception apparatus 20.

The reception unit 202 receives the digital broadcasting signals transmitted from the transmission apparatus 10 via an antenna 211, carries out processing such as OFDM demodulation on the digital broadcasting signals to obtain a physical layer frame, and supplies the physical layer frame to the physical layer frame processing unit 203.

The physical layer frame processing unit 203 carries out processing on the physical layer frame supplied from the reception unit 202 to extract a Generic packet and supplies the Generic packet to the packet processing unit 204. The physical layer frame processing unit 203 also acquires L1-post signaling information arranged in the preamble of the physical layer frame and supplies it to the signaling processing unit 205.

The packet processing unit 204 acquires LLS signaling information from the Generic packet supplied from the physical layer frame processing unit 203 and supplies it to the signaling processing unit 205.

The packet processing unit 204 also extracts an IP packet from the Generic packet supplied from the physical layer frame processing unit 203 and acquires component data and SLS signaling information. The SLS signaling information is supplied to the signaling processing unit 205, and the component data is supplied to the decoder 206.

The L1-post signaling information from the physical layer frame processing unit 203 and the LLS signaling information and SLS signaling information from the packet processing unit 204 are supplied to the signaling processing unit 205. The signaling processing unit 205 processes the L1-post signaling information, the LLS signaling information, or the SLS signaling information as appropriate and supplies the signaling information to the control unit 201.

The control unit 201 controls the operations of the respective units based on the signaling information supplied from the signaling processing unit 205. For example, the control unit 201 controls processing carried out by the physical layer frame processing unit 203 based on the L1-post signaling information. Further, for example, the control unit 201 controls packet filtering carries out by the packet processing unit 204 based on the LLS signaling information and SLS signaling information so that the data of (components of) the video, audio, and like is supplied to the decoder 206.

The decoder 206 decodes the data of (components of) the video, audio, and the like supplied from the packet processing unit 204 according to a predetermined decoding method and supplies the resultant video data to the display unit 207 and audio data to the speaker 208.

The display unit 207 displays video corresponding to the video data supplied from the decoder 206. Further, the speaker 208 outputs audio corresponding to the audio data supplied from the decoder 206. As a result, in the reception apparatus 20, video and audio of a content provided by a service selected by a user (e.g., television program) are output.

It should be noted that although the configuration in which the display unit 207 and the speaker 208 are incorporated in the reception apparatus 20 is described assuming that the reception apparatus 20 is a stationary receiver such as a television receiver or a mobile receiver such as a smartphone and a tablet terminal in FIG. 16, the display unit 207 and the speaker 208 may be provided outside in a case where the reception apparatus 20 is a recorder, a set top box (STB: Set Top Box), or the like.

<7. Flow of Processing Executed in Each Apparatus>

Figure 17:
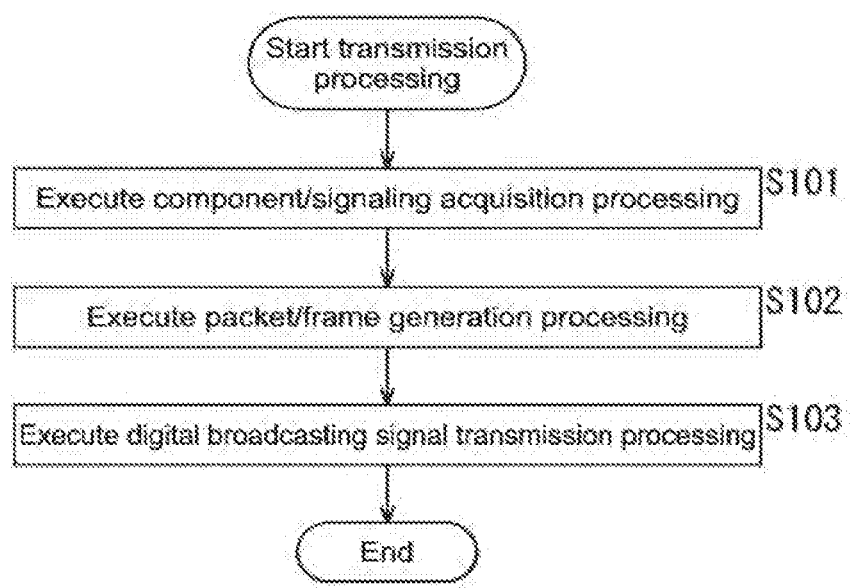
FIG. 17 A flowchart explaining transmission processing.
Figure 18:
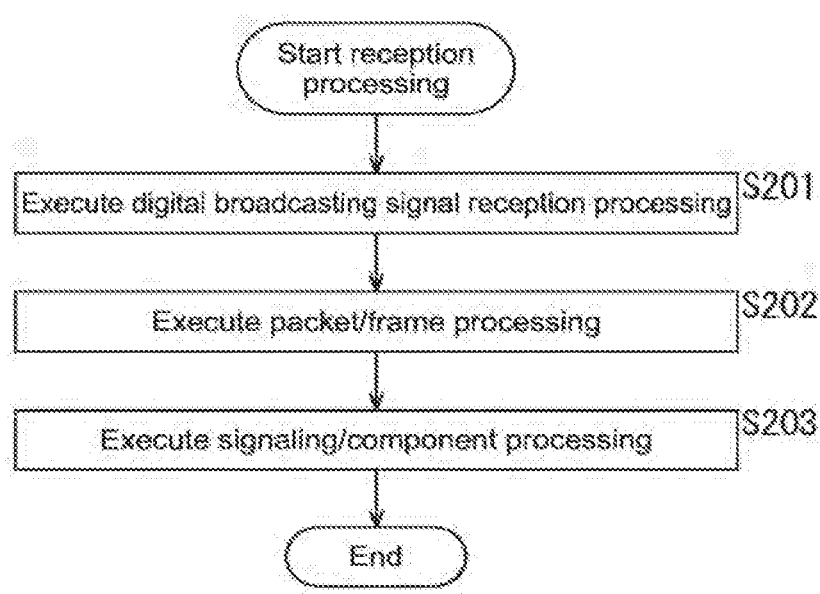
FIG. 18 A flowchart explaining reception processing.

Next, with reference to the flowcharts of FIGS. 17 and 18, flows of processing executed in the respective apparatuses constituting the transmission system 1 shown in FIG. 1 will be described.

(Transmission Processing)

First, with reference to the flowchart of FIG. 17, transmission processing executed by the transmission apparatus 10 shown in FIG. 1 will be described.

In Step S101, component/signaling acquisition processing is carried out.

In the component/signaling acquisition processing, the component acquisition unit 102 acquires components of video, audio, and the like, and the encoder 103 encodes the data of the components of video, audio, and the like. Also in the component/signaling acquisition processing, the signaling generation unit 104 generates signaling information, and the signaling processing unit 105 processes the signaling information.

In Step S102, packet/frame generation processing is carried out.

In the packet/frame generation processing, the packet generation unit 106 generates an IP packet or a Generic packet, and the physical layer frame generation unit 107 generates a physical layer frame. Here, information that expresses the presence/absence of LLS signaling information and belonging to a PLP group (LLS_EXIST_FLAG, PLP_GROUP_ID), that is specified as the descriptors of the present technology (FIG. 2), is arranged in a PLP loop of the L1-post signaling information arranged in the preamble of the physical layer frame.

In Step S103, digital broadcasting signal transmission processing is carried out.

In the digital broadcasting signal transmission processing, the transmission unit 108 processes the physical layer frame and transmits it as digital broadcasting signals via the antenna 111.

The flow of the transmission processing has been described heretofore.

(Reception Processing)

Next, with reference to the flowchart of FIG. 18, reception processing executed by the reception apparatus 20 shown in FIG. 1 will be described.

In Step S201, digital broadcasting signal reception processing is carried out.

In the digital broadcasting signal reception processing, the reception unit 202 receives the digital broadcasting signals via the antenna 211.

In Step S202, packet/frame processing is carried out.

In the packet/frame processing, the physical layer frame processing unit 203 extracts the Generic packet and L1-post signaling information from the physical layer frame, and the packet processing unit 204 extracts the IP packet and LLS signaling information from the Generic packet. The packet processing unit 204 also extracts component data and SLS signaling information from the packet.

Here, information that expresses the presence/absence of LLS signaling information and belonging to a PLP group (LLS_EXIST_FLAG, PLP_GROUP_ID), that is specified as the descriptors of the present technology (FIG. 2), is arranged in the PLP loop of the L1-post signaling information. The control unit 201 controls the packet processing unit 204, the signaling processing unit 205, and the like baaed on LLS_EXIST_FLAG and PLP_GROUP_ID so that processing for enabling LLS signaling information and SLS signaling information to be acquired from a specific PLP out of PLPs belonging to a PLP group is carried out, for example.

In Step S203, signaling/component processing is carried out.

In the signaling/component processing, the control unit 201 controls the operations of the respective units baaed on the LLS signaling information or SLS signaling information, and decoder 206 decodes the data of the components of video, audio, and the like. As a result, video of a content is displayed on the display unit 207, and audio thereof is output from the speaker 208.

The flow of the reception processing has been described heretofore.

<8. Computer Configuration>

The above-mentioned series of processing may be executed by hardware or may be executed by software. If the series of processing is executed by software, programs configuring that software are installed into a computer. FIG. 19 is a diagram showing a configuration example of hardware of a computer that executes the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 900 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

Furthermore, the present technology may also take the following configurations.

(1) A reception apparatus, including:
a reception unit that receives a content transmitted in an IP (Internet Protocol) transmission system;
an acquisition unit that acquires, based on first control information that is transmitted in a first layer in a protocol stack of the IP transmission system and includes information indicating whether second control information transmitted in a second layer higher than the first layer exists, the second control information; and
a control unit that controls operations of the units that process the content based on the second control information.

(2) The reception apparatus according to (1), in which
the first layer is a physical layer of broadcast waves having a predetermined frequency band,
the physical layer is used to transmit data for each of one or a plurality of PLPs (Physical Layer Pipes) that can be grouped, and
the first control information includes information used for identifying a PLP group as a group of the PLPs.

(3) The reception apparatus according (2), in which
the PLPs can belong to one or a plurality of PLP groups.

(4) The reception apparatus according to (2) or (3), in which
the information used for identifying a PLP group has a bitmap configuration in which the PLP group is allocated to each bit of a bit string.

(5) The reception apparatus according to any one of (2) to (4), in which
the second control information is transmitted for each PLP group.

(6) The reception apparatus according to any one of (2) to (5), in which
the IP transmission system conforms to ATSC (Advanced Television Systems Committee) 3.0, and
the first control information is arranged in a preamble of a physical layer frame constituted of the preamble and a data section.

(7) The reception apparatus according to (6), in which
the first control information is L1-post signaling information specified by the ATSC 3.0, and
the second control information is LLS (Link Layer Signaling) signaling information including information used for selecting the content.

(8) A reception method for a reception apparatus, including the steps of:
by the reception apparatus,
receiving a content transmitted in an IP transmission system;
acquiring, based on first control information that is transmitted in a first layer in a protocol stack of the IP transmission system and includes information indicating whether second control information transmitted in a second layer higher than the first layer exists, the second control information; and
controlling operations of units that process the content based on the second control information.

(9) A transmission apparatus, including:
an acquisition unit that acquires a content transmitted in an IP transmission system;
a generation unit that generates first control information that is transmitted in a first layer in a protocol stack of the IP transmission system and includes information indicting whether second control information transmitted in a second layer higher than the first layer exists; and
a transmission unit that transmits the first control information and the second control information together with the content according to the IP transmission system.

(10) The transmission apparatus according to (9), in which
the first layer is a physical layer of broadcast waves having a predetermined frequency band,
the physical layer is used to transmit data for each of one or a plurality of PLPs that can be grouped, and
the first control information includes information used for identifying a PLP group as a group of the PLPs.

(11) The transmission apparatus according to (10), in which
the PLPs can belong to one or a plurality of PLP groups.

(12) The transmission apparatus according to (10) or (11), in which the information used for identifying a PLP group has a bitmap configuration in which the PLP group is allocated to each bit of a bit string.

(13) The transmission apparatus according to any one of (10) to (12), in which the second control information is transmitted for each PLP group.

(14) The transmission apparatus according to any one of (10) to (13), in which the IP transmission system conforms to ATSC 3.0, and the first control information is arranged in a preamble of a physical layer frame constituted of the preamble and a data section.

(15) The transmission apparatus according to (14), in which the first control information is L1-post signaling information specified by the ATSC 3.0, and the second control information is LLS signaling information including information used for selecting the content.

(16) A transmission method for a transmission apparatus, including the steps of:

by the transmission apparatus, acquiring a content transmitted in an IP transmission system;

generating first control information that is transmitted in a first layer in a protocol stack of the IP transmission system and includes information indicating whether second control information transmitted in a second layer higher than the first layer exists; and transmitting the first control information and the second control information together with the content according to the IP transmission system.

DESCRIPTION OF REFERENCE NUMERALS 1 transmission system
10 transmission apparatus
20 reception apparatus
30 transmission channel
101 control unit
102 component acquisition unit
104 signaling generation unit
106 packet generation unit
107 physical layer frame generation unit
108 transmission unit
201 control unit
202 reception unit
203 physical layer frame processing unit
204 packet processing unit
205 signaling processing unit
900 computer
901 CPU

The invention claimed is:

1. A reception apparatus, comprising:

a receiver configured to receive digital broadcasting signals and carry out orthogonal frequency division multiplexing (OFDM) demodulation on the digital broadcasting signals to obtain a physical layer frame; and at least one processor configured to process the physical layer frame to acquire first signaling information arranged in a preamble of the physical layer frame, wherein the first signaling information includes plural flags, each corresponding to a physical layer pipe of plural physical layer pipes, each of the plural flags representing presence or absence of second signaling information required for selecting a service arranged in the respective physical layer pipe, the physical layer frame includes a bootstrap preceding the preamble, the first signaling information is layer 1 (L1) signaling information transmitted in L1, and the second signaling information is received in a packet of a layer higher than the layer 1, the packet including a header.

2. The reception apparatus according to claim 1, wherein the second signaling information is transmitted in layer 2 (L2).

3. The reception apparatus according to claim 2, wherein the second signaling information includes a service information table, and each of the plural flags represents presence or absence of the service information table in the respective physical layer pipe.

4. The reception apparatus according to claim 1, wherein the second signaling information includes information other than emergency alert information, and each of the plural flags represents presence or absence of the information other than the emergency alert information in the respective physical layer pipe.

5. The reception apparatus according to claim 1, wherein the reception apparatus is a television receiver.

6. The reception apparatus according to claim 1, wherein the reception apparatus includes a display and a speaker, wherein the at least one processor is configured to decode video data and audio data, wherein the display is configured to display video corresponding to the video data, and wherein the speaker is configured to output audio corresponding to the audio data.

7. A reception method for a reception apparatus, comprising:

receiving, by a receiver, digital broadcasting signals and carrying out orthogonal frequency division multiplexing (OFDM) demodulation on the digital broadcasting signals to obtain a physical layer frame; and processing, by at least one processor, the physical layer frame to acquire first signaling information arranged in a preamble of the physical layer frame, wherein the first signaling information includes plural flags, each corresponding to a physical layer pipe of plural physical layer pipes, each of the plural flags representing presence or absence of second signaling information required for selecting a service arranged in the respective physical layer pipe, the physical layer frame includes a bootstrap preceding the preamble, the first signaling information is layer 1 (L1) signaling information transmitted in L1, and the second signaling information is received in a packet of a layer higher than the layer 1, the packet including a header.

8. The reception method according to claim 7, wherein the second signaling information is transmitted in layer 2 (L2).

9. The reception method according to claim 8, wherein the second signaling information includes a service information table, and each of the plural flags represents presence or absence of the service information table in the respective physical layer pipe.

10. The reception method according to claim 7, wherein
the second signaling information includes information other than emergency alert information, and
each of the plural flags represents presence or absence of the information other than the emergency alert information in the respective physical layer pipe.

11. The reception method according to claim 7, wherein the method includes:
decoding video data and audio data, by the at least one processor,
displaying, by a display, video corresponding to the video data, and
outputting, by a speaker, audio corresponding to the audio data.

12. A transmission apparatus, comprising:
at least one processor configured to
generate a physical layer frame including first signaling information arranged in a preamble of the physical layer frame, and
perform orthogonal frequency division multiplexing (OFDM) modulation on the physical layer frame; and
a transmitter configured to transmit the OFDM modulated physical layer frame in digital broadcasting signals, wherein
the first signaling information includes plural flags, each corresponding to a physical layer pipe of plural physical layer pipes, each of the plural flags representing presence or absence of second signaling information required for selecting a service arranged in the respective physical layer pipe,
the physical layer frame includes a bootstrap preceding the preamble,
the first signaling information is layer 1 (L1) signaling information transmitted in L1, and
the second signaling information is transmitted in a packet of a layer higher than the layer 1, the packet including a header.

13. The transmission apparatus according to claim 12, wherein the second signaling information is transmitted in layer 2 (L2).

14. The transmission apparatus according to claim 13, wherein
the second signaling information includes a service information table, and
each of the plural flags represents presence or absence of the service information table in the respective physical layer pipe.

15. The transmission apparatus according to claim 12, wherein
the second signaling information includes information other than emergency alert information, and
each of the plural flags represents presence or absence of the information other than the emergency alert information in the respective physical layer pipe.

16. A transmission method for a transmission apparatus, comprising:
generating, by at least one processor, a physical layer frame including first signaling information arranged in a preamble of the physical layer frame;
performing orthogonal frequency division multiplexing (OFDM) modulation on the physical layer frame; and
transmitting, by a transmitter, the OFDM modulated physical layer frame in digital broadcasting signals, wherein
the first signaling information includes plural flags, each corresponding to a physical layer pipe of plural physical layer pipes, each of the plural flags representing presence or absence of second signaling information required for selecting a service arranged in the respective physical layer pipe,
the physical layer frame includes a bootstrap preceding the preamble,
the first signaling information is layer 1 (L1) signaling information transmitted in L1, and
the second signaling information is transmitted in a packet of a layer higher than the layer 1, the packet including a header.

17. The transmission method according to claim 16, wherein the second signaling information is transmitted in layer 2 (L2).

18. The transmission method according to claim 17, wherein
the second signaling information includes a service information table, and
each of the plural flags represents the presence or absence of the service information table in the respective physical layer pipe.

19. The transmission method according to claim 16, wherein
the second signaling information includes information other than emergency alert information, and
each of the plural flags represents presence or absence of the information other than the emergency alert information in the respective physical layer pipe.

* * * * *